United States Patent [19]

Getman

[11] 4,155,689
[45] May 22, 1979

[54] APPARATUS FOR PRODUCING AND PROCESSING FROZEN CONFECTIONS

[75] Inventor: Harlan R. Getman, Toledo, Ohio

[73] Assignee: Vroman Foods, Inc., Toledo, Ohio

[21] Appl. No.: 883,925

[22] Filed: Mar. 6, 1978

Related U.S. Application Data

[62] Division of Ser. No. 793,635, May 4, 1977, Pat. No. 4,100,304.

[51] Int. Cl.² ............................ A23G 9/04; A23G 9/24
[52] U.S. Cl. ........................................ 425/112; 425/113; 425/114
[58] Field of Search ........................ 425/112, 113, 114; 426/281, 282, 283

[56] References Cited

U.S. PATENT DOCUMENTS

| 2,611,327 | 9/1952 | Rudolph | 425/114 |
| 2,899,915 | 8/1959 | Tomik | 425/112 |
| 2,923,257 | 2/1960 | Monaco | 425/114 |
| 3,171,367 | 3/1965 | Carter et al. | 426/282 |
| 3,667,971 | 6/1972 | Brunner | 426/282 |

Primary Examiner—John C. Bleutge
Assistant Examiner—A. H. Koeckert
Attorney, Agent, or Firm—Harry O. Ernsberger

[57] ABSTRACT

The disclosure embraces a method of and apparatus for processing or forming bodies of confections or desserts that become viscous or of paste-like consistency at reduced temperatures such as dairy ingredients including ice cream, ice milk or other edibles such as aerated marshmallow or the like, the bodies of confections being of disc-like configurations having central voids, providing a supply of a mixture embodying a viscous or paste-like edible and fragments of solid edible materials, successively severing metered quantities of the mixture from the supply by a sharp instrumentality, and moving the metered quantities of the mixture by the instrumentality into the central voids of the disc-like bodies.

6 Claims, 4 Drawing Figures

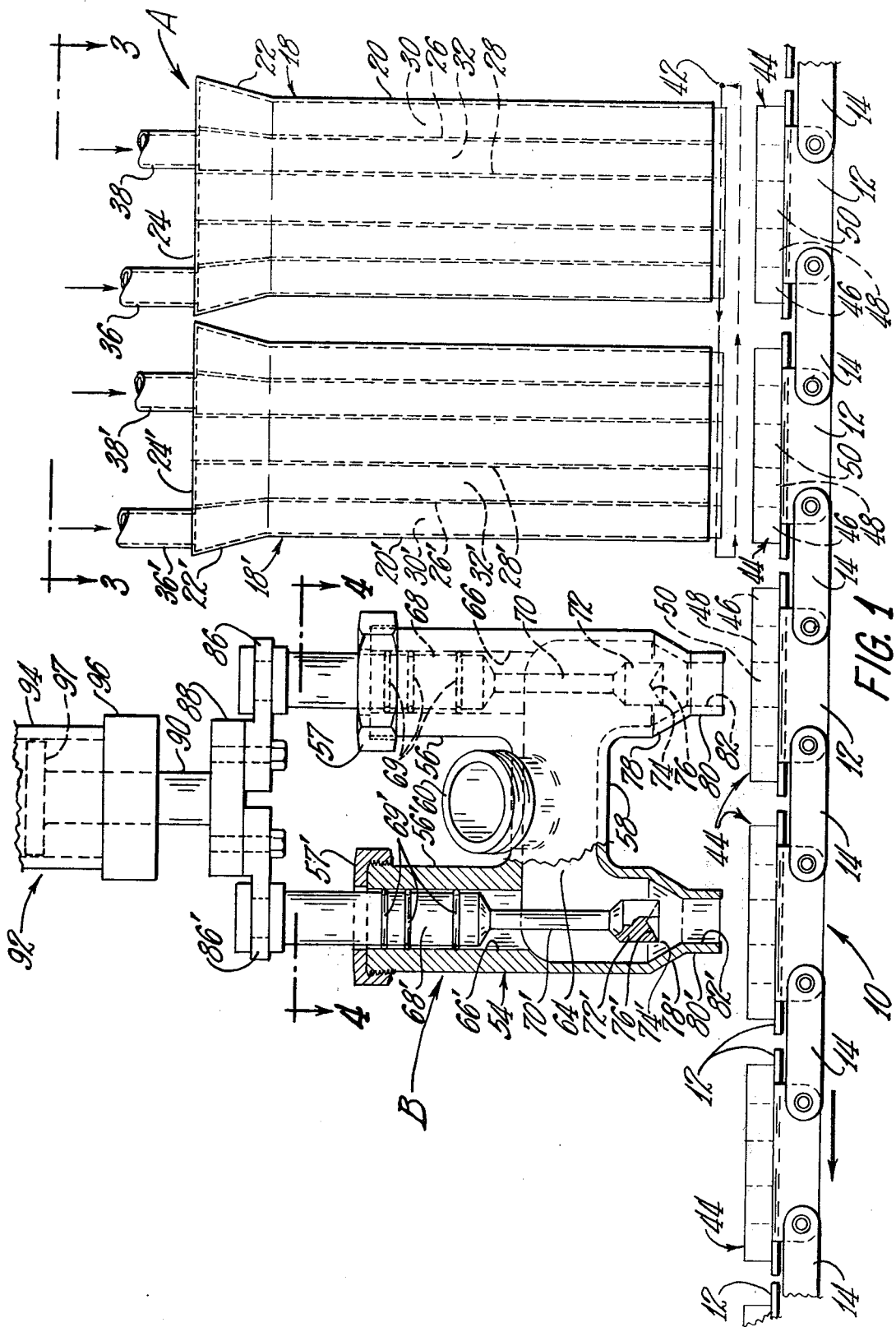

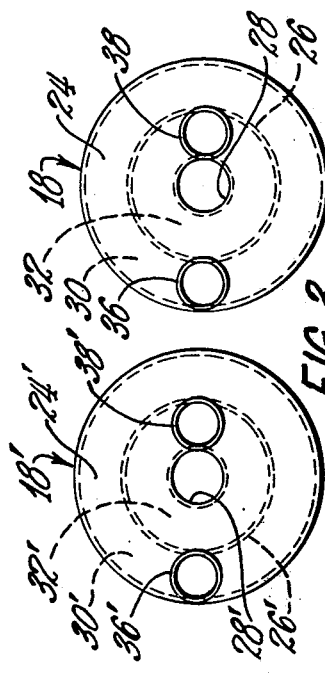
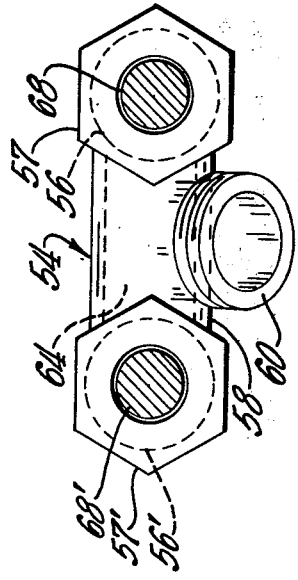
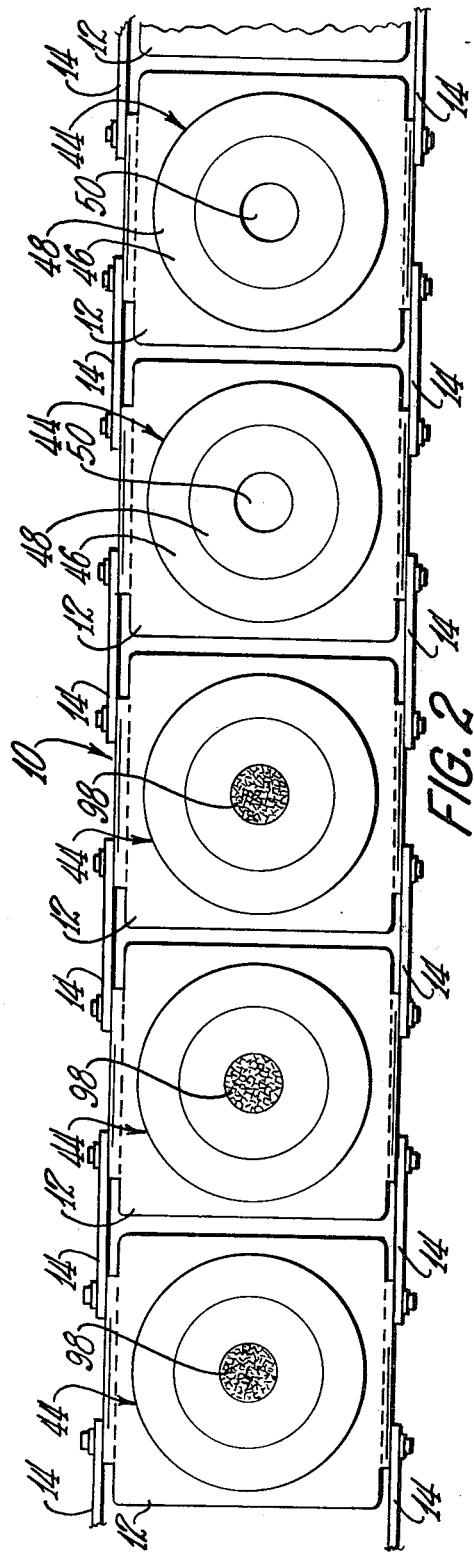

APPARATUS FOR PRODUCING AND PROCESSING FROZEN CONFECTIONS

This is a division of application Ser. No. 793,635, filed May 4, 1977, now U.S. Pat. No. 4,100,304.

The invention relates to a method of and apparatus for processing confections wherein the end product is a frozen confection and more especially for processing bodies of dairy ingredients or aerated marshmallow in a partially frozen viscous condition wherein the bodies have central voids, metering quantities of a mixture of a dairy product or aerated marshmallow and fragments of edible solid materials by severing the metered quantities from a supply by a sharp instrumentality, and delivering the metered quantities into the central voids in the bodies.

An object of the invention resides in a method of and apparatus for forming and processing partially frozen or viscous bodies of confection comprising a dairy product, aerated marshmallow or the like and a mixture of a dairy product or aerated marshmallow and fragments of edible solid materials, the method including the steps of providing annular or ring-shaped disc-like bodies of a dairy product or aerated marshmallow at a station, successively conveying the bodies to a second station, supplying a mixture of a dairy product or aerated marshmallow in a viscous condition and fragments of edible materials to a chamber at the second station, severing metered or predetermined amounts or quantities of the mixture at the second station by a movable instrumentality having a sharp edge, and moving the severed metered quantities by the instrumentality into central voids or spaces in the bodies.

Another object of the invention resides in a method of processing partially frozen or viscous confections which include the steps of conveying disc-like bodies of a dairy ingredient or aerated marshmallow having central voids to a processing station, establishing a supply of a mixture of a diary ingredient or aerated marshmallow and fragments of edible solids such as nut meats, fruit pieces, candied fruits and the like, successively severing by a sharp instrumentality metered portions of the mixture containing fragments of edible solids from the supply, and forcing the metered portions into the central voids in the disc-like bodies of dairy ingredients.

Another object of the invention resides in an apparatus for processing confections comprising a moving conveyor, a first station having a manifold or container at which partially frozen viscous confection, such as ice cream, ice milk, aerated marshmallow or the like is extruded from the manifold or container and extruded portions severed to form disc-like bodies having central voids, a second station having a chamber receiving from a supply a mixture of dairy ingredient or aerated marshmallow and fragments of edible solids, and a metering means including a member having a sharp edge arranged to sever predetermined amounts of the mixture containing fragments of edible solids in the chamber and delivering the metered predetermined amounts into the central voids in the bodies of dairy ingredients.

Another object of the invention resides in an apparatus for processing confections, the apparatus embodying a chamber adapted to contain a mixture of a dairy ingredient or aerated marshmallow in a viscous state and fragments of edible solids, and a reciprocable member having a sharp circular edge arranged to sever predetermined or metered amounts of the mixture, the member being adapted to extrude the metered amounts into central void regions of partially frozen annular bodies of dairy ingredients or aerated marshmallow.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is a semischematic side elevational view of an apparatus for processing bodies of confections, such as dairy ingredients or the like illustrating method steps or stations of the process;

FIG. 2 is a top plan view of a movable conveyor shown in FIG. 1 illustrating bodies of partially frozen or viscous confections supported on the conveyor;

FIG. 3 is a top plan view taken substantially on the line 3—3 of FIG. 1 illustrating apparatus for forming bodies of dairy constituents or the like, and FIG. 4 is a sectional view taken substantially on the line 4—4 of FIG. 1 illustrating an apparatus for metering and delivering a mixture of fragments of edible solids into voids or spaces in the bodies of partially frozen or viscous ingredients.

The method and apparatus of the invention have particular utility in forming or processing partially frozen or viscous confections embodying dairy ingredients or similar ingredients into bodies of substantially circular disc-like configuration, the ingredients in the bodies being arranged in substantially concentric annular or ring-like portions in contiguous relation with central void regions or spaces which, in processing, are filled with a mixture of a dairy or similar ingredient and fragments of edible solids. It is to be understood that the bodies may be of other configurations such as square or polygonal in shape.

Referring to the drawings and initially to FIG. 1, there is illustrated semischematically an endless belt-type conveyor 10 and stations at which method steps are performed in producing or processing partially frozen or viscous edible bodies or products of confections. The conveyor 10 comprises platform-type links 12 which are articulately joined by links 14, the conveyor 10 being of conventional construction for conveying partially frozen bodies of confection.

The conveyor construction is mounted on sprockets (not shown) and arranged for intermittent movement in a conventional manner by a suitable motor (not shown), the motive means being controlled to provide a periodically interrupted or step-by-step movement of the conveyor 10.

The apparatus includes a station "A" at which disc-like bodies of partially frozen or viscous confection comprising one or more dairy ingredients or aerated marshmallow or the like are formed, and a station "B" at which voids in the formed bodies of confection are filled with an edible viscous composition or mixture including fragments of edible solids. In the embodiment illustrated the processing facilities at stations "A" and "B" are of a character for forming or processing two bodies of confection concomitantly but it is to be understood that more than two bodies may be processed concomitantly utilizing the method of the invention.

At station "A" the partially frozen or viscous bodies of dairy ingredient, such as ice cream, ice milk, sherbet, or bodies of aerated marshmallow and the like, are formed from one or more supplies of ingredients. In the illustrated embodiment the bodies are of circular contour and comprise one annular body portion of one color or flavor of ingredient and a contiguous annular portion of a different flavor or color of ingredient with central voids or spaces in the bodies defined by the inner annular portions.

The apparatus at station "A" for forming partially frozen viscous ingredients into bodies is of a character to concomitantly form two bodies which are delivered onto two platform links 12 of the conveyor 10, the two identical units for forming the bodies being designated 18 and 18'. Each of the units comprises a metal container, manifold or magazine 20 and 20', each being of generally cylindrical configuration, the upper portions 22 and 22' being flared upwardly and outwardly as shown in FIG. 1.

The upper ends of the manifolds are closed by sealed cover members 24 and 24'. Vertically disposed within the cylindrical manifolds 20 and 20' are comparatively thin metal cylindrical sleeves or walls 26 and 26' preferably concentric with the outer walls of the manifolds 20 and 20'. Preferably centrally disposed within the sleeves or walls 26 and 26' are thin-walled cylindrical members 28 and 28'. As shown in FIG. 3, the members 18, 26, 28 and the members 18', 26', and 28' are preferably concentric in cross section.

The concentric walls or sleeves 18 and 26 and 18' and 26' define annular chambers 30 and 30'. The cylindrical members 26, 28 and 26', 28' define annular inner chambers 32 and 32'. The annular chambers 30, 32 and 30', 32' are open at the bottom providing delivery exits for the partially frozen viscous ingredients contained in the chambers of the manifolds. The central regions defined by the cylindrical members 28, 28' are open at the top and bottom providing an air space or passage in which there are no ingredients.

The apparatus or arrangement shown at station "A" in FIG. 1 is of a character for forming annular or ring-shaped bodies of dairy ingredients or aerated marshmallow ingredients of different flavors or colors wherein individual rings of the ingredients are in contiguous concentric relation in the bodies.

The manifold chambers 30, 32 and 30', 32' are respectively connected with supplies of ingredients or constituents in partially frozen or viscous condition. As an example, the manifold chambers 30 and 30' may contain and be supplied with a confection, ingredient or constituent, such as ice cream, ice milk, sherbet, aerated marshmallow or the like, of one color or flavor, and the inner chambers 32 and 32' may contain and be supplied with a similar confection, ingredient or constituent of a different flavor or color.

Connected with the upper ends of the outer annular chambers 30 and 30' are tubular members or means 36 and 36' which are connected in a conventional manner with supplies of one ingredient or constituent of one color or flavor. The upper ends of the inner manifold chambers 32 and 32' are connected by tubular members or means 38 and 38' with supplies of a confection, ingredient or constituent of a different color or flavor.

The supplies of the ingredients or constituents of the confection are pressurized to force the ingredients through the tubes into the chambers 30, 30' and 32, 32' to effect extrusion of the confections or constituents of annular configuration through the lower open ends of the chambers 30, 30' and 32, 32'. Conventional metering pumps may be utilized to meter the flow rate of the confections or constituents and thereby regulate the pressure on the constituents delivered to the chambers.

The flow rate of the supplies must be accurately controlled as the flow rate of the ingredients must be substantially constant so that bodies of equal thickness of the confection may be obtained from the mixture being extruded from the containers 20 and 20'. It is also imperative that the temperatures of the ingredients in the containers 20 and 20' be maintained constant to assure that the ingredients are at a proper viscosity in the containers to attain a uniform extrusion rate of the ingredients.

The conveyor 10 is driven by a motive means (not shown) controlled in a conventional manner to provide a periodically interrupted or step-by-step movement of the conveyor. The step-by-step movement of the conveyor is desirable in order to properly and effectively carry out the method steps in forming the disc-like bodies.

Means is provided for severing or separating bodies of confection ingredients as the ingredients are extruded from the lower ends of the containers or manifolds 20 and 20'. In the embodiment illustrated, the severing means includes an electrically energized resistance wire 42 supported by means (not shown) arranged to move the wire horizontally across the exits of the containers 20 and 20'. The wire is energized to a red heat or temperature sufficient to sever disc-like bodies 44 of the ingredients extruded from the containers.

It is conventional practice to sever bodies of ice cream or ice milk from supplies employing the hot wire method. The severed bodies fall onto the platform links 12 of the conveyor as shown in FIG. 1. The hot wire or severing device 42 during its return movement, as indicated by the arrows in FIG. 1, traverses a path above the bodies which have already been severed and deposited on the platform links.

The bodies 44 thus formed comprise an outer annulus or ring 46 and an inner annulus or ring 48 of the confection ingredients or constituents extruded from the respective chambers of the containers 20 and 20', the rings 46 and 48 being concentric and contiguous. The central regions of the bodies 44 are voids or spaces 50 as there is no ingredient extruded from the central tubular members 28 and 28'.

The bodies 44 comprising concentric rings 46 and 48 of confection ingredients are established or formed at station "A" as hereinabove described. As the contiguous annular components or rings 46 and 48 of the confection bodies 44 are at a temperature rendering the ingredients viscous or paste-like, the rings are in contiguous engaging concentric relation in the bodies.

It is desirable to fill the central spaces or voids 50 of the bodies of confection with edible materials, some of which may be solids. For example, it may be desirable to fill the voids or spaces 50 with a mixture containing an ingredient in a viscous condition and fragments of edible solids such as pieces or fragments of fruit, candied fruits, nut pieces or fragments of other edible solids.

Successive increments of movements of the conveyor 10 convey the bodies 44, shown in FIG. 1, from station "A" to station "B" at which metered quantities of the mixture may be injected or delivered into the voids or spaces 50 in the bodies 44. It is unfeasible to fill the voids 50 in the bodies at station "A" because an electrically-energized hot wire such as the wire 42 will not satisfactorily sever fragments or pieces of edible solid materials.

One arrangement illustrated at station "B" is adapted to meter and sever predetermined quantities or amounts of such a mixture from a supply and move the metered quantities into the voids 50 in the bodies 44. The arrangement at station "B" includes a manifold or member 54 having two cylindrical portions 56 and 56' integrally connected by a connector or portion 58. The upper ends of the portions 56 and 56' are provided with caps 57.

A central region of the connector 58 is fashioned with an integral tubular coupling member 60 adapted to be joined with a tubular means (not shown) connected with a supply (not shown) of the edible viscous mixture. The cylindrical portions 56 and 56' and the connector 58 provide a manifold or chamber 64 containing the mixture from a supply. The mixture in the chamber 64 is preferably pressurized by a mixture metering pump (not shown) of conventional construction.

The cylindrical portions 56 and 56' are provided with cylindrical bores 66 and 66'. Slidably received in the bores are piston-like plungers or members 68 and 68' having sealing rings 69 and 69' engaging the walls of the bores 66 and 66'. The caps 57 and 57' may be provided with sealing rings or glands (not shown) in sealing contact with the plungers 68 and 68'. Each of the plungers is provided with a downwardly extending member 70 and 70'.

The members 70 and 70' are fashioned with metering portions or instrumentalities 72 and 72' for metering predetermined amounts or quantities from the mixture in the manifold or chamber 64 for delivery into the voids 50 in the confection bodies 44. The instrumentalities 72 and 72' are cylindrically shaped and the lower ends of the instrumentalities are provided with sharp circular edges 74 and 74' formed by the convergence of the interior surfaces of conically-shaped recesses 76 and 76' with exterior cylindrical surfaces of the instrumentalities.

The lower end regions of the cylindrical portions 56 and 56' are fashioned with inwardly flared portions 78 and 78' which terminate in cylindrical portions 80 and 80' providing nozzles having interior bores 82 and 82' to receive and slidably accommodate the instrumentalities or members 72 and 72'.

Means is provided for vertically reciprocating the plungers 68 and 68', members 70 and 70' and instrumentalities 72 and 72'. In the arrangement shown in FIG. 1, the plungers 68 and 68' are connected with members 86 and 86' which are mounted on a head 88 connected with a piston rod 90 of a conventional pneumatically-operated servomotor 92 or other motive means. The servomotor 92 is provided for reciprocating the members 86 and 86', the plungers 68 and 68' and associated components.

The servomotor is inclusive of a cylinder 94 having heads 96 at its respective ends, only one of the heads being illustrated in FIG. 1. A piston 97 within the cylinder 94 is mounted on the piston rod 90 and is reciprocable in the cylinder. The piston 97 is actuated in both directions by air under pressure delivered alternately to the respective ends of the cylinder and controlled by conventional valve means (not shown) in timed relation with incremental movements of the conveyor 10.

When the piston rod and piston 97 are moved downwardly, the mixture metering and severing instrumentalities 72 and 72' are moved downwardly. The recessed ends of the instrumentalities 72 and 72' force predetermined amounts or quantities of the mixture from the chamber 64 into the bores 82 and 82'. Under pressure of the motive means 92, the sharp edges 74 and 74' entering the bores 82 and 82' effectively sever the fragments of edible solids in the mixture such as fruit pieces, candied fruit, nut pieces and the like so that the severed metered quantities of the mixture are separated from the mixture in the manifold or chamber 64.

Through this severing arrangement the fruit, nut pieces or fragments of edible solids in the mixture are effectively severed so that separated or metered amounts of the mixture are contained in the bores 82 and 82'. As the instrumentalities 72 and 72' are further moved downwardly by the motive means 92, the instrumentalities or members 72 and 72' move or extrude the metered or predetermined amounts of mixture in the bores 82 and 82' into the central voids or spaces 50 in the central regions of the bodies of confection disposed beneath the portions 80 of the cylindrical portions 56 and 56'. The metered or predetermined amounts of the mixture in the bodies are indicated at 98 in FIG. 2.

The operation of the apparatus in carrying out the method is as follows: A motor for advancing the conveyor 10 is energized, the control means of which intermittently moves the conveyor so that the bodies are successively moved from station "A" to station "B." Supplies of differently colored or flavored confection ingredients are established and metering or feed pumps therefor activated to force the viscous confection ingredients downwardly at a predetermined rate in the compartments or chambers 30, 30' and 32, 32', extruding the viscous confection ingredients from the lower ends of the manifolds 18 and 18'.

The electrically energized heater or hot wire 42 is moved by conventional means horizontally beneath the ends of the manifolds 18 and 18' severing the bodies 44 of the viscous confections extruded from the containers. The bodies 44 from the containers fall by gravity onto the platform links 12 of the conveyor, this position of the bodies being illustrated in FIG. 1.

The timer control for the operating conveyor 10 energizes the conveyor motor intermittently to move the conveyor through successive distances to convey the bodies 44 from station "A" to station "B" with the central void regions or spaces 50 in the bodies in vertical alignment with the bores 82 and 82' and the mixture metering and severing instrumentalities 72 and 72'. When the bodies reach this position at station "B" a conventional timer actuates valve means associated with the servomotor 92 to exert downward pressure on the piston 97 thus moving the instrumentalities 72, 72' downwardly.

The chamber 64, being filled with the mixture of viscous confection and fragments of edible solids, and the mixture being under pressure of a conventional metering or feed pump, is forced past the instrumentalities 72 and 72' into the bores 82 and 82'. As the instrumentalities 72 and 72' move downwardly the mixture is severed at the entrance to the bores 82 and 82' by the circular sharp edges 74 and 74' of the instrumentalities, the severing thus metering predetermined amounts or quantities of the mixture in the bores 82 and 82'.

Further downward movement of the instrumentalities 72 and 72' forces, delivers or extrudes the metered quantities in the bores 82 and 82' into the voids or spaces 50 in the bodies 44 of confection disposed beneath the exits or nozzles 80 and 80'. The instrumentalities move the metered quantities of mixture into the voids so that the voids are completely filled with the edible mixture as shown at 98 in FIG. 2.

The bodies of confection with the voids filled as shown at 98 are moved by the conveyor through a conventional low temperature or refrigerating chamber to freeze the bodies to a solidified or rigid state as is conventional in producing frozen confections.

While the manifolds 18 and 18' are provided with chambers for fashioning bodies of confection of two different colors or flavors of ice cream, ice milk, aerated marshmallow or the like, it is to be understood that a single annular body or more than two concentric annular bodies may be fashioned by the method.

While the manifolds at station "A" and the operations of filling the voids with edible mixture at station "B" are illustrated as forming and processing bodies in a single row lengthwise of the conveyor, it is to be understood that the manifolds 18 and 18' and the cylindrical members 56 and 56' and associated components may be arranged transversely of the direction of movement of the conveyor. In such arrangement the conveyor is moved in step-by-step movements or increments one-half the distance of the increments of movement of the conveyor herein illustrated. In such arrangements, the platform links 12 of the conveyor are fashioned of a width to accommodate two of the bodies of confection in side-by-side transverse relation.

It is apparent that, within the scope of the invention, modifications and different arrangements may be made other than as herein disclosed, and the present disclosure is illustrative merely, the invention comprehending all variations thereof.

I claim:

1. Apparatus for processing confections that become viscous at reduced temperatures including a movable conveyor, means for successively delivering disc-like bodies of the confection in viscous condition onto the conveyor, the disc-like bodies having central voids, means providing a chamber adapted to contain a mixture of a confection in a viscous state and fragments of edible solid materials, a mixture delivery nozzle in communication with the chamber, an instrumentality in the chamber reciprocable with respect to the nozzle, means for reciprocating the instrumentality, an end region of the instrumentality being configurated to provide a severing edge, said conveyor being movable to successively convey the disc-like bodies to a position wherein the central voids in the bodies are successively aligned with the nozzle, said instrumentality being adapted to sever successive portions of the mixture from the supply and move the portions through the nozzle into central voids of the disc-like bodies.

2. Apparatus for processing confections that become viscous at reduced temperatures including a movable conveyor, means for successively delivering disc-like annular bodies of confection in viscous condition onto the conveyor, means providing a chamber adapted to contain a supply of an edible mixture comprising a confection in a viscous state and fragments of edible solid materials, a mixture delivery nozzle connected with the chamber, a mixture metering and severing instrumentality in the chamber reciprocable with respect to said nozzle, means for reciprocating the instrumentality, said conveyor being movable to successively convey the disc-like bodies to a position wherein the central voids in the annular bodies are successively aligned with said nozzle, said instrumentality having a sharpened end portion adapted to sever a metered portion of the mixture from the supply, said instrumentality being adapted to move the metered portions through the nozzle into central voids of disc-like bodies.

3. Apparatus for processing confections that become viscous at reduced temperatures including, in combination, an intermittently movable conveyor, means at a first station successively delivering disc-like bodies of confection in a viscous condition onto the conveyor, the disc-like bodies having central voids, means at a second station for delivering quantities of mixture comprising a viscous confection and fragments of edible solid materials into the central voids in the disc-like bodies, said conveyor intermittently conveying the disc-like bodies from the first station to the second station, said means including a member at the second station having a chamber adapted to contain a supply of the mixture, said member having a delivery nozzle, a reciprocable plunger, said plunger having an end portion recessed to provide a sharp severing edge, and means for reciprocating the plunger in timed relation with movements of the conveyor for severing quantities of the mixture from the supply in the chamber and moving the severed quantities through the nozzle into the central voids in the disc-like bodies as the bodies are successively moved by the conveyor to a position wherein the nozzle is in registration with the void in a body.

4. Apparatus for processing confections that become viscous at reduced temperatures including a movable conveyor, a manifold having a delivery opening disposed above and aligned with the path of movement of the conveyor, said manifold having a manifold chamber of ring-shaped cross section arranged to contain a viscous confection, tubular means for conveying the viscous confection from a supply into the manifold chamber, means for successively severing disc-like ring-shaped bodies of confection extruded at the delivery opening, the bodies being deposited on the conveyor, a second manifold spaced from the first manifold and aligned with the path of movement of the conveyor, said second manifold containing a supply of mixture of viscous confection and solid fragments of edible material, said second manifold having a tubular exit, and a reciprocable metering means in said second manifold having a plunger portion aligned with the tubular exit and engageable with the mixture in the second manifold, said plunger portion having a sharp circular edge, said plunger portion adapted to sever metered amounts of the mixture from the supply and convey the metered amounts into the central voids of the ring-shaped bodies as the bodies are successively moved into alignment with the reciprocable metering means.

5. Apparatus for processing annular bodies of confection wherein the confection becomes viscous at reduced temperatures comprising, in combination, a member fashioned with a chamber adapted to contain a supply of a mixture of confection in a viscous state and fragments of edible solid materials, the member having a nozzle, a reciprocable instrumentality in the chamber having a portion movable into and away from the nozzle, means for reciprocating the instrumentality, an end portion of the instrumentality having a configuration providing a sharp severing edge, and means for successively conveying the annular bodies of confection to a position wherein the central space in an annular body is in registration with the nozzle, said end portion of the instrumentality being adapted to sever a predetermined amount of the mixture from the supply as the end portion enters the nozzle and moves the severed amount into the central space in the body of the confection in registration with the nozzle.

6. Apparatus for processing annular bodies of confection wherein the confection becomes viscous at reduced temperatures comprising, in combination, a member fashioned with a chamber adapted to contain a supply of a mixture of confection in a viscous state and fragments of edible solid materials, the said member having two nozzles in spaced relation and in communication with the chamber, two reciprocable instrumentalities in the chamber, each of the instrumentalities having an end portion movable into and away from each of the nozzles, means for reciprocating the instrumentalities, an end portion of each instrumentality having a configuration providing a sharp severing edge, and means for successively conveying annular bodies of confection to positions wherein the central space in each of the annular bodies is in registration with one of the nozzles, the end portions of the instrumentalities being adapted to sever predetermined amounts of the mixture from the supply as the end portions enter the nozzles and move the severed amounts into the central spaces in the bodies of confection in registration with the nozzles.

* * * * *